US012110948B2

(12) United States Patent
Schumann et al.

(10) Patent No.: US 12,110,948 B2
(45) Date of Patent: Oct. 8, 2024

(54) RACK STEERING SYSTEM AND MOTOR VEHICLE HAVING SUCH A RACK STEERING SYSTEM

(71) Applicant: Volkswagen Aktiengesellschaft, Wolfsburg (DE)

(72) Inventors: Heiko Schumann, Braunschweig (DE); Christian Schillak, Diekholzen (DE); Jens Rogall, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 253 days.

(21) Appl. No.: 17/671,178

(22) Filed: Feb. 14, 2022

(65) Prior Publication Data

US 2022/0163100 A1 May 26, 2022

Related U.S. Application Data

(63) Continuation of application No. PCT/EP2020/072285, filed on Aug. 7, 2020.

(30) Foreign Application Priority Data

Aug. 14, 2019 (DE) ...................... 10 2019 212 213.2

(51) Int. Cl.
*B62D 3/12* (2006.01)
*F16H 19/04* (2006.01)
*F16H 25/22* (2006.01)

(52) U.S. Cl.
CPC ............. *F16H 19/04* (2013.01); *B62D 3/126* (2013.01); *F16H 25/2204* (2013.01)

(58) Field of Classification Search
CPC .... B62D 3/126; B62D 5/0406; B62D 5/0403; F16H 25/2015
See application file for complete search history.

(56) References Cited

U.S. PATENT DOCUMENTS

| 4,754,829 A | 7/1988 | Shimizu |
| 6,851,508 B2 | 2/2005 | Fukuda et al. |
| (Continued) | | |

FOREIGN PATENT DOCUMENTS

| CN | 109923026 A | 6/2019 |
| DE | 3712154 A1 | 10/1987 |
| (Continued) | | |

OTHER PUBLICATIONS

International Search Report dated Nov. 12, 2020 in corresponding application PCT/EP2020/072285.

*Primary Examiner* — Gregory Robert Weber
(74) *Attorney, Agent, or Firm* — Muncy, Geissler, Olds & Lowe , P.C.

(57) ABSTRACT

A rack steering system and a motor vehicle having such a rack steering system. The inventive rack steering system comprises a steering gear housing, a toothed rack, which extends through the steering gear housing, an electric motor, which is coupled to the toothed rack on a thread side of the steering gear housing via a ball screw to provide an axial force to the toothed rack, and two track rod links arranged at axial ends of the toothed rack. The steering gear housing is designed in one piece such that a drive insert opening is formed on the thread side of the steering gear housing for arrangement of the electric motor and a direct stop face for a track rod link or a support face for the arrangement and axial support of a separate stop element for a track rod link is also formed on this thread side.

10 Claims, 7 Drawing Sheets

(56) References Cited

U.S. PATENT DOCUMENTS

| | | | |
|---|---|---|---|
| 7,258,035 | B2 | 8/2007 | Bieber |
| 10,746,280 | B2* | 8/2020 | Kamaguchi ............ B62D 3/126 |
| 10,995,799 | B2* | 5/2021 | Douglas ................ F16H 55/36 |
| 11,377,138 | B2* | 7/2022 | Ishii ........................ B22C 9/24 |
| 2006/0183583 | A1* | 8/2006 | Sakaida ............... B62D 5/0424 |
| | | | 474/70 |
| 2007/0144823 | A1 | 6/2007 | Senda et al. |
| 2018/0334187 | A1 | 11/2018 | Kato |
| 2019/0283797 | A1 | 9/2019 | Steck et al. |

FOREIGN PATENT DOCUMENTS

| | | |
|---|---|---|
| DE | 10353161 A1 | 6/2005 |
| DE | 102007012655 A1 | 7/2008 |
| DE | 102007000680 A1 | 5/2009 |
| DE | 102009001804 A1 | 10/2010 |
| DE | 102014225641 A1 | 6/2016 |
| DE | 102014225644 A1 | 6/2016 |
| DE | 102015219316 A1 | 4/2017 |
| DE | 102016207663 A1 | 11/2017 |
| EP | 1429951 B1 | 5/2005 |

* cited by examiner

RACK STEERING SYSTEM AND MOTOR VEHICLE HAVING SUCH A RACK STEERING SYSTEM

This nonprovisional application is a continuation of International Application No. PCT/EP2020/072285, which was filed on Aug. 7, 2020, and which claims priority to German Patent Application No. 10 2019 212 213.2, which was filed in Germany on Aug. 14, 2019, and which are both herein incorporated by reference.

BACKGROUND OF THE INVENTION

Field of the Invention

The present invention relates to a rack steering system, in particular for a motor vehicle. In relation to the invention, explicit reference is also made in this respect to motor vehicles with such a rack steering system.

Description of the Background Art

DE 10 2007 012 655 A1, which is incorporated herein by reference, discloses an electromechanical rack steering system with an elastic end stop. This rack steering system comprises a steering gear housing, a toothed rack which extends through the steering gear housing, an electric motor which is coupled to the toothed rack via a ball screw in order to provide an axial force at the toothed rack, and track rod links, which are arranged at the axial ends of the toothed rack. Among other things, spring elements are described as stop elements, which are to be inserted from outside into the steering gear housing. For this purpose, it is necessary to form the steering gear housing in two parts, with a main housing and a housing cover, which, due to the forces to be absorbed via the stop elements, are manufactured as pressure diecast parts.

SUMMARY OF THE INVENTION

It is therefore an object of the present invention to provide a rack steering system, in particular a motor vehicle with such a rack steering system, by means of which, with equivalent functionality, the manufacturing costs can be reduced.

An exemplary rack steering system according to the invention comprises a steering gear housing, a toothed rack, which extends through the steering gear housing, an electric motor, which is coupled to the toothed rack on a thread side of the steering gear housing via a ball screw in order to provide an axial force at the toothed rack, and two track rod links, which are arranged at the axial ends of the toothed rack. In this case, the steering gear housing is designed in one piece in such a way that a drive insert opening is formed on the thread side of the steering gear housing for arrangement of the electric motor, and a direct stop face for a track rod link or a support face for the arrangement and axial support of a separate stop element for a track rod link is also formed on this thread side.

Due to design considerations for the housing, it is preferred if the direct stop face or the support face does not extend over the full circumference, but includes one or more partial circumferential segments, so that a gap or multiple gaps in the stop face or support face can be used to feed through a belt.

In a particularly simple variant, the stop face or support face can be formed as a partial circumferential segment, in particular as a partial circular segment, which extends over an angular range of 120° to 320°, in particular over an angular range that extends over more than 180°, preferably over an angular range of 200° to 300°.

The invention is particularly advantageous with regard to the manufacturing costs because the formation of a direct stop face or a support face for supporting a separate stop element makes it possible, independently of each other, to construct a housing cover intended for sealing the opening as a simple and cost-effectively producible element, and to use it, in particular, as a plastic injection molded part that does not have to absorb force itself.

In a further practical embodiment of a rack steering system according to the invention, a mounting arm, which extends in the radial and/or axial direction, is formed on the thread side of the housing, or several mounting arms extending in the radial and/or axial direction are formed on the thread side of the housing. This refers to any mounting structures with which, starting from the housing, a—preferably structurally simple—fixed connection to a body element of a motor vehicle can be produced, in particular a screw connection, frame element or a subframe of a motor vehicle.

For this purpose, at least one screw opening is preferably formed on each mounting arm in order to establish a screw connection with fastening screws between the respective mounting arm and the frame element or subframe of a motor vehicle.

As already mentioned, it is advantageous for cost reasons if the drive insert opening is closed by means of a plastic cover, in particular if the steering gear housing has a direct stop face or support face and optionally also one or more mounting arms. In this case, sufficient closure can still be ensured with the plastic cover. On the other hand, those geometries which are exposed to mechanical stress, in particular by the track rod link, and which absorb forces when the track rod link is struck and must transfer them via a frame or a subframe, are provided at the steering gear housing itself. In particular, reference is made to a direct stop face or a support face for a separate stop element as well as to the mounting arms.

Alternatively, or in addition to closing the drive insert opening by means of a cover, the drive insert opening can also be closed by means of a cuff. The use of a cuff, in particular if it is an at least partially elastic cuff, which, due to its elasticity can be combined for use with different sizes of drive insert openings, has the further advantage that two or more geometries of drive insert openings can be closed with a certain type of cuff, so that the number of identical parts increases in comparison with the use of covers that match the size and geometry of the drive insert opening. Thus, the manufacturing costs for inventive rack steering systems can be further reduced.

A support face extending only over a part of the circumference of a circular ring can be formed, wherein a drive belt functionally arranged between the electric motor and the ball screw extends through the area in which there is no support face. In this case, a particularly simple assembly of a unit formed of an electric motor and a drive belt results, in particular also in connection with the ball screw, even if, during assembly, the electric motor with its control is to be inserted as far as possible or completely into the drive insert opening.

By providing at least one support rib, by means of which the support face is enlarged, the distribution of the force on a separate stop element that is supported by the support face can be improved to the extent that the contact area is further enlarged.

Suitable as a separate stop element is, for example, at least a circular ring-shaped disc, wherein such a disc in the simplest embodiment has two flat, circular ring-shaped front sides that are parallel to each other. A separate stop element may in principle be made of a plastic adequately designed and dimensioned. Preferably, however, a separate stop element is made of a metallic material, in particular of the same material or of a material having approximately the same coefficient of thermal expansion. Materials having the same coefficient of thermal expansion are in particular those materials whose deviation of the coefficient of thermal expansion amounts to a maximum of 30 percent, more preferably a maximum of 20 percent and particularly preferably a maximum of 10 percent. This has the advantage that a potential firm bonding of the separate stop element is largely temperature resistant, and that there is a low risk of extreme temperatures leading to easier detachment of the stop element from the steering gear housing.

The stiffness of a separate stop element may be optimized for certain application cases, in particular by providing structures for stiffening and/or in that the stop element is conically shaped. For example, such a structural design can optimize the stress distribution in the respective stop element and increase the bending stiffness and fatigue strength, and/or minimize the required material use per stop element.

If a separate stop element is provided in a rack steering system, this is preferably firmly connected to the steering gear housing, in particular to avoid that a track rod link striking this stop element from the outside wedges itself with the stop element during striking and that then, during re-deflection of the track rod link, the stop element is moved out of its target position.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
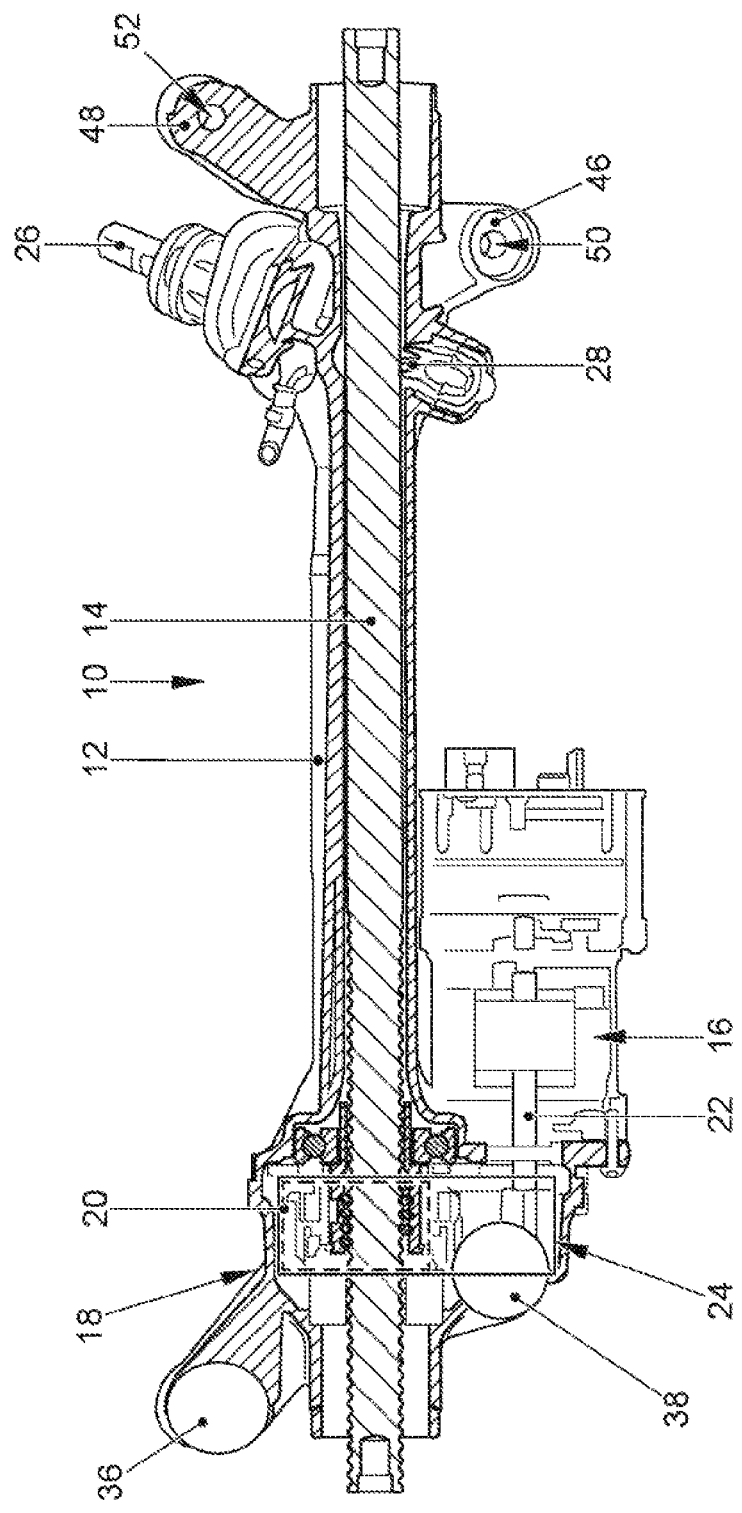
FIG. 1 is a sectional view of a schematic representation of a steering gear housing of the invention with further elements arranged therein.

FIG. 1 shows a schematic representation of a rack steering system 10 with an inventive steering gear housing 12, a toothed rack 14, which extends through the steering gear housing 12, and an electric motor 16, which is coupled to the toothed rack 14 on a thread side 18 of the steering gear housing 12 via a ball screw 20. In the embodiment shown, the link between the electric motor 16 and the ball screw 20 is established via a motor shaft 22 and a belt drive 24 transmitting the drive torque of the electric motor 16. Alternatively, the functional connection between electric motor 16 and ball screw 20 can also be made with other suitable transmission elements.

For the sake of completeness, it is also pointed out that in the shown embodiment the toothed rack 14 has a toothing on the side opposite the thread side 18 on which a pinion 28 arranged at the lower end of a steering shaft 26 engages. By turning a not-shown steering wheel, which is coupled to the steering shaft 26, it is possible for the driver of a not-shown motor vehicle to manually apply a steering torque. If necessary, this steering torque can be supported by a steering auxiliary torque of the electric motor 16 by supporting a displacement of the toothed rack 14 via the ball screw 20.

Only schematically shown in FIG. 1 are a first mounting arm 36 extending in the axial direction and the radial direction, and a second mounting arm 38 extending predominantly in the radial direction. Furthermore, a third mounting arm 46 and a fourth mounting arm 48 are formed on the steering gear housing 12 on the side opposite the thread side, both of which have an opening 50, 52 each.

FIGS. 2 to 6 show different views of a slightly deviating embodiment of a steering gear housing 12 according to the invention. The steering gear housing 12 is also designed in one piece in such a way that a drive insert opening 44 is formed on the thread side 18 for inserting the electric motor. A support face 30 for the arrangement and axial support of a separate stop element 32 for a track rod link 34 is also formed on the thread side 18.

As can be clearly seen in FIGS. 2 to 6, a first mounting arm 36 extending in the axial direction and a second mounting arm 38 extending in the axial direction are further formed on the steering gear housing 12 on the thread side 18. In the embodiment shown, the two mounting arms 36, 38 both have an opening 40, 42 each and thus allow for simple screwing of the mounting arms 36, 38 to a body-fixed element, in particular to a not-shown subframe of a motor vehicle.

Figure 2:
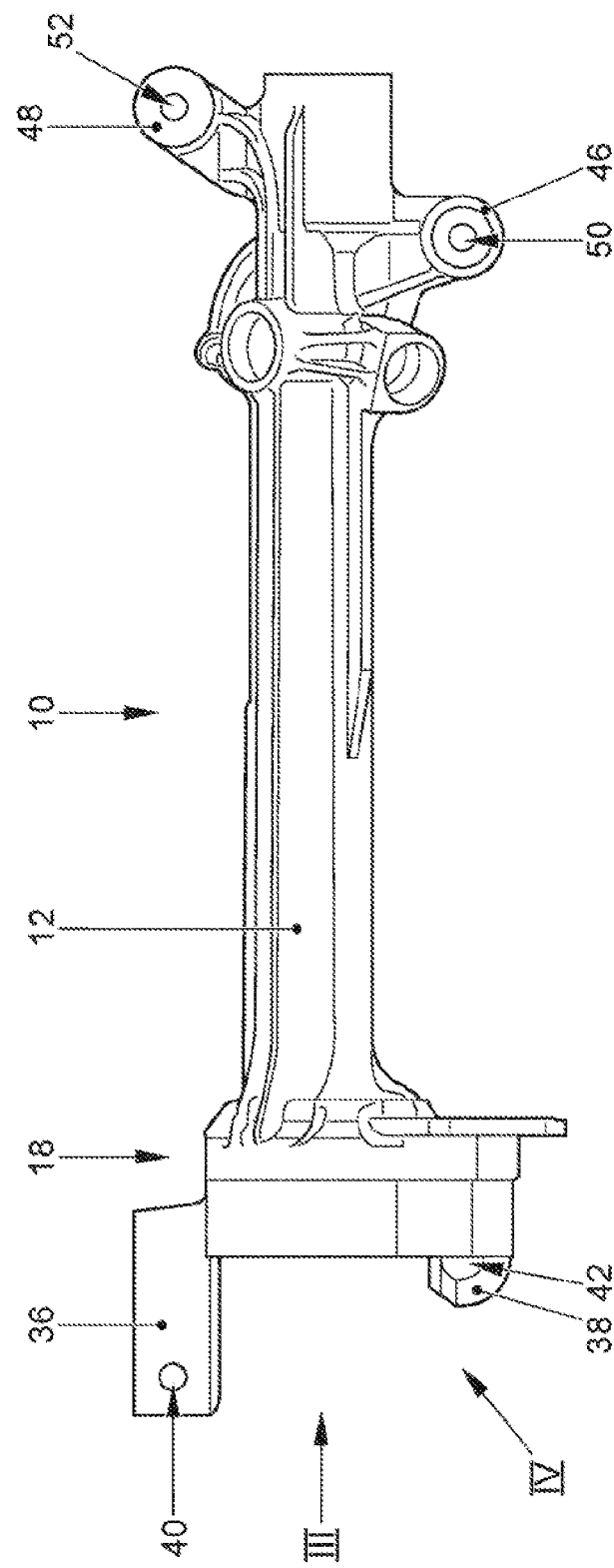
FIG. 2 is a representation of an inventive steering gear housing without further elements in an isometric representation.
Figure 3:
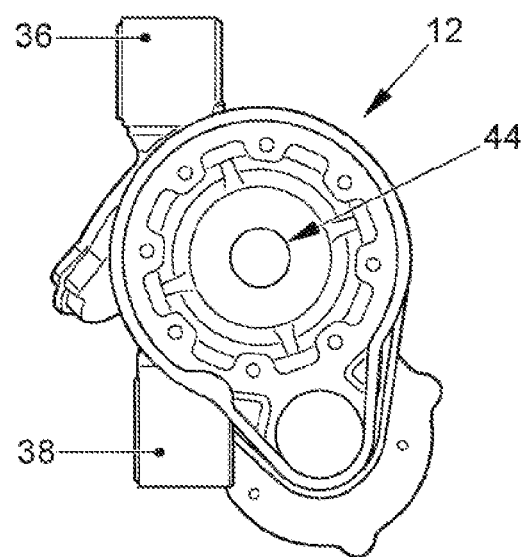
FIG. 3 is a representation of the steering gear housing from FIG. 2 in a view according to the arrow III in FIG. 2.
Figure 4:
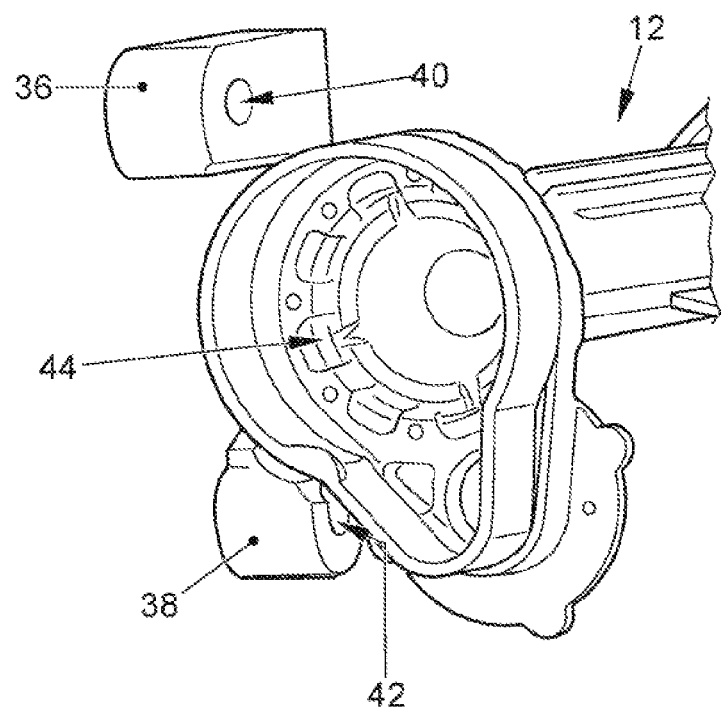
FIG. 4 is a representation of the steering gear housing from FIGS. 2 and 3 in a view according to the arrow IV in FIG. 2.

As can be seen in FIG. 2, a third mounting arm 46 and a fourth mounting arm 48 are formed on the steering gear housing 12 on the side opposite the thread side 18, both of which also have an opening 50, 52 each. The third mounting arm 46 and the fourth mounting arm 48 each extend predominantly in the radial direction and slightly in the axial direction.

Figure 6:
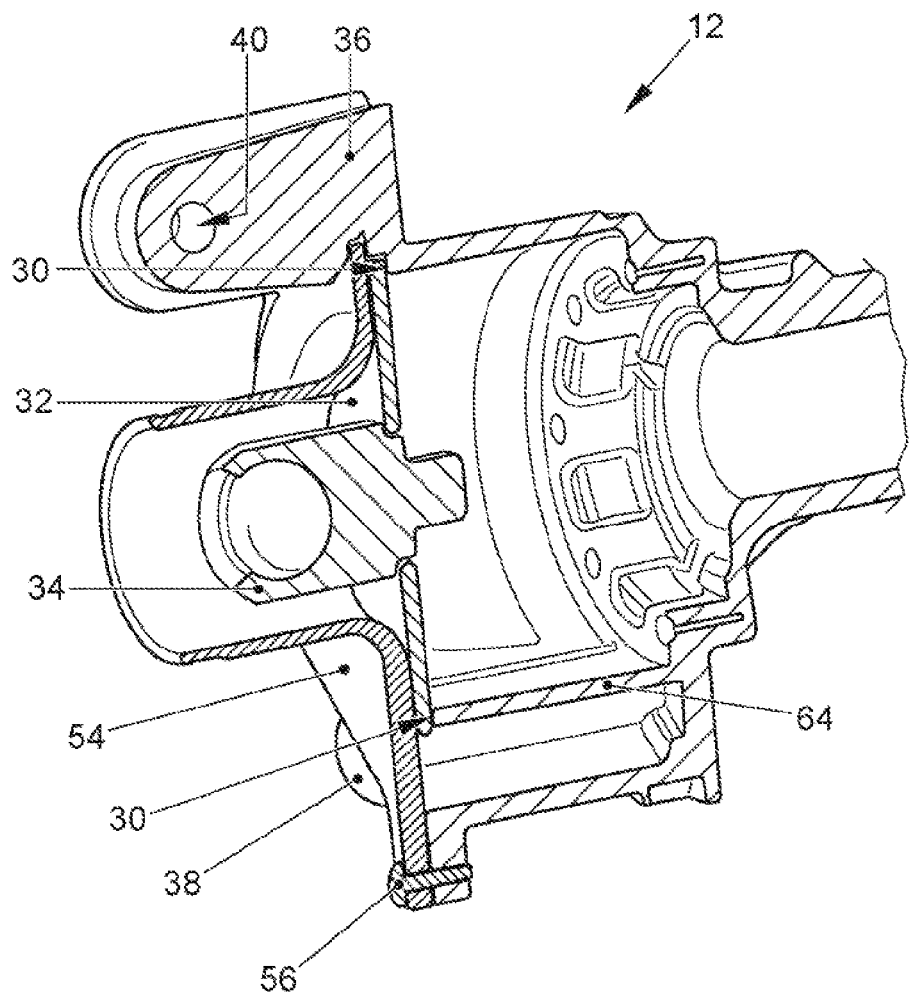
FIG. 6 is a sectional view of a detail of the steering gear housing from FIGS. 2 to 5 with the track rod link, stop disc and a mounting screw in the mounting position.

As can be clearly seen in FIG. 6, the stop element 32 is firmly connected to the steering gear housing 12 in the final assembly position, e.g., by caulking, pressing, soldering, welding and/or gluing. The drive insert opening 18 is closed by means of a cover 54, which is preferably made inexpensively of plastic. In the embodiment shown, the cover is screwed with four mounting screws 56.

Figure 5:
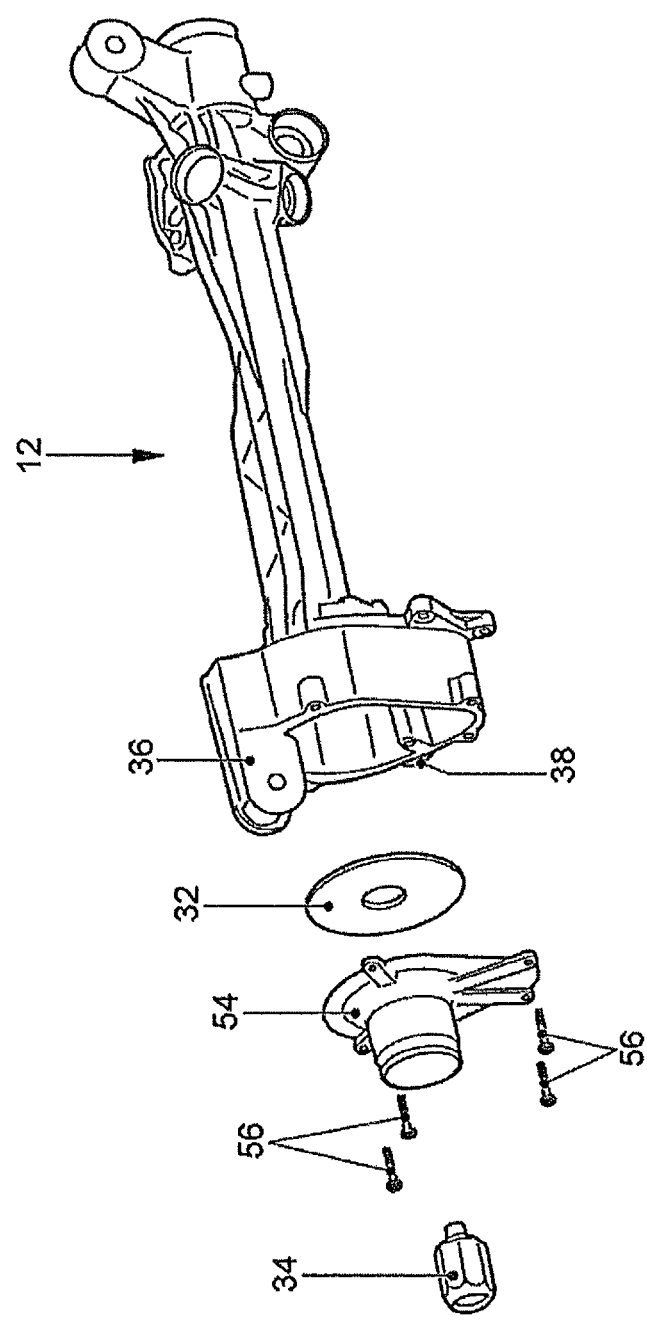
FIG. 5 is an exploded view of a representation of the steering gear housing from FIGS. 2 to 4 with a stop disc, a cover, a track rod link, and mounting screws.

In FIGS. 5 and 6, a simple circular ring-shaped disc is provided as a stop element 32.

Here it can also be seen in FIG. 6 that in the steering gear housing 12, a support rib 64 extending in the axial direction is formed in such a way that an additional support face 30 is provided, specifically a suitable circular ring-shaped design of the steering gear housing 12 with a shoulder serving as a support face 30 and the left-facing end face of the support rib 64 serving as a further support face 30, so that the overall result is a larger support face 30.

FIGS. 7 to 10 show further variants for usable, alternative stop elements 32, which are also designed as circular ring-shaped discs.

Figure 7:
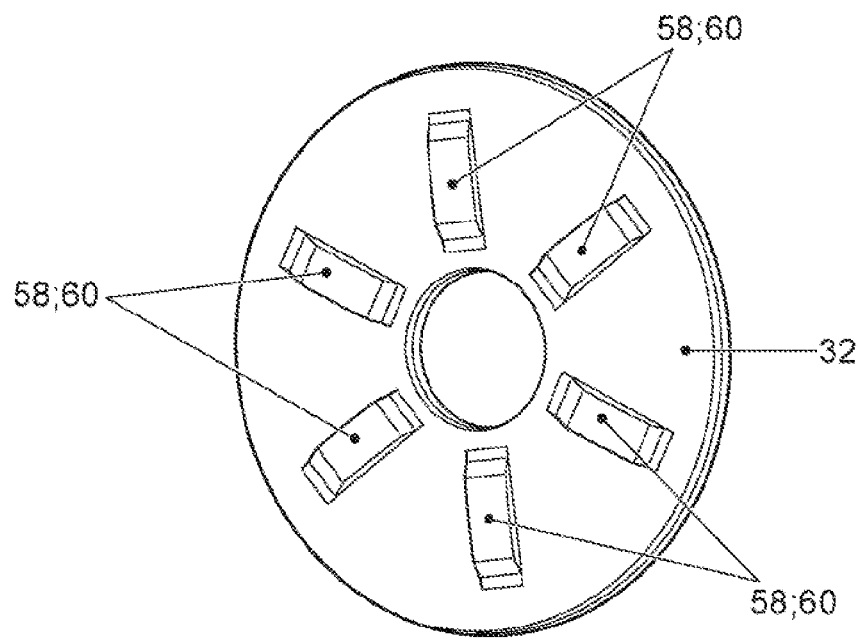
FIG. 7 is another example design of a stop disc with stiffeners.

The stop element 32 according to FIG. 7 has six stiffeners 58 in the form of stamped embossments 60.

Figure 8:
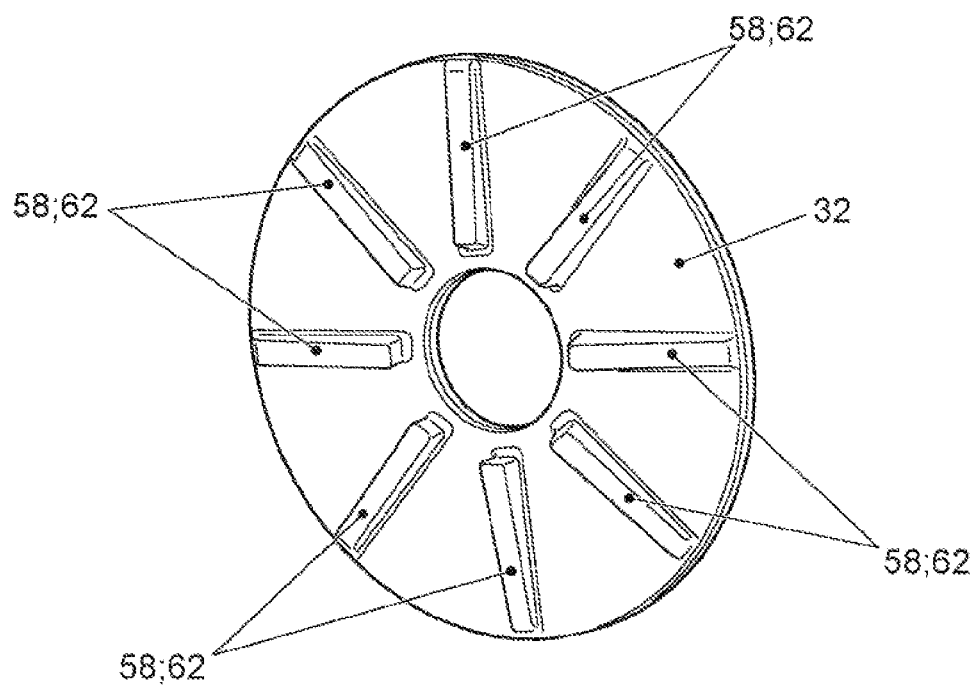
FIG. 8 is another example design of a stop disc with stiffeners.

The stop element 32 according to FIG. 8 has six stiffeners 58 in the form of ribs 62, which can be produced in particular by molding.

Figure 9:
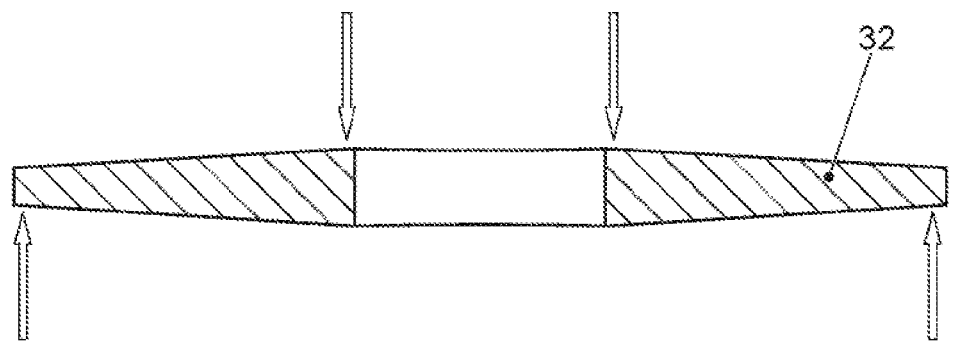
FIG. 9 is another example design of a stop disc with a two-sided conical geometry.

The stop element 32 according to FIG. 9 is designed to be conical on two sides.

Figure 10:
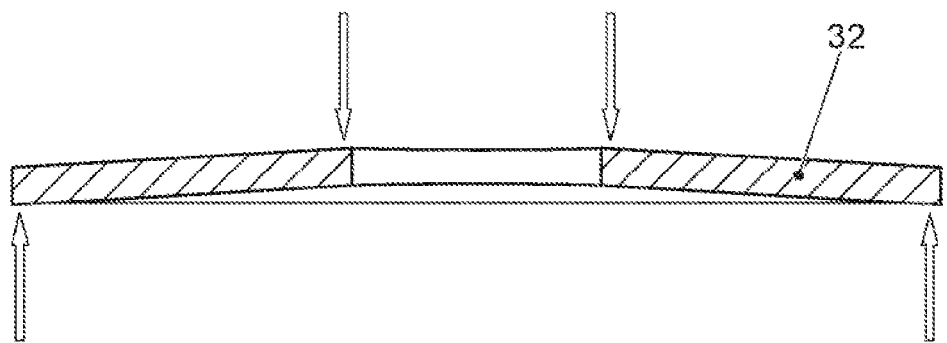
FIG. 10 is another example design of a stop disc with a one-sided conical geometry.

The stop element 32 according to FIG. 10 is designed to be conical on one side as a spring disc.

The features of the invention disclosed in the present description, drawings and claims may be essential, both individually and in any combination, for the implementation of the invention in its various embodiments. The invention can be varied within the scope of the claims and taking into account the knowledge of the competent skilled person.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A rack steering system comprising:
   a steering gear housing;
   a toothed rack that extends through the steering gear housing;
   an electric motor coupled to the toothed rack on a thread side of the steering gear housing via a ball screw in order to provide an axial force at the toothed rack; and
   two track rod links arranged at the axial ends of the toothed rack,
   wherein the steering gear housing is monolithic such that a drive insert opening for arrangement of the electric motor is formed on the thread side of the steering gear housing and a support face is also formed on the thread side for the arrangement and axial support of a separate stop element for one of the two track rod links, and
   wherein the support face extends along a part of the circumference of a circular ring, and wherein a drive belt, which is functionally arranged between the electric motor and the ball screw, extends through another part of the circumference of the circular ring in which there is no support face.

2. The rack steering system according to claim 1, wherein a mounting arm is provided on the thread side of the steering gear housing, the mounting arm extending in a radial and/or axial direction, or wherein multiple mounting arms are provided on the thread side of the steering gear housing, which each respectively extend in the radial and/or axial direction.

3. The rack steering system according to claim 2, wherein at least one screw opening is formed on each mounting arm.

4. The rack steering system according to claim 1, wherein the drive insert opening is closed via a plastic cover.

5. The rack steering system according to claim 4, wherein the separate stop element is discrete from the plastic cover.

6. The rack steering system according to claim 1, wherein at least one support rib is provided, via which the surface of the support face is enlarged.

7. The rack steering system according to claim 1, wherein at least one circular ring-shaped disc is provided as the separate stop element.

8. The rack steering system according to claim 1, wherein the separate stop element has structures for stiffening and/or is conically formed.

9. The rack steering system according to claim 1, wherein the separate stop element is firmly connected to the steering gear housing.

10. The rack steering system according to claim 1, wherein the separate stop element directly contacts the support face.

* * * * *